United States Patent
Pettinato

[15] 3,685,350
[45] Aug. 22, 1972

[54] ULTRASONIC PROBE

[72] Inventor: Giuseppe Pettinato, Florence, Italy

[22] Filed: Dec. 28, 1970

[21] Appl. No.: 102,267

Related U.S. Application Data

[63] Continuation of Ser. No. 743,650, July 10, 1968, abandoned.

[52] U.S. Cl. ................................. 73/71.5, 310/8.3
[51] Int. Cl. ............................................ G01n 29/00
[58] Field of Search............. 73/67.5, 67.7, 67.8, 71.5

[56] References Cited

UNITED STATES PATENTS

| | | | |
|---|---|---|---|
| 2,751,783 | 6/1956 | Erdman | 73/67.8 |
| 3,019,637 | 2/1962 | Cook et al. | 73/67.7 |
| 3,228,231 | 1/1966 | Joy | 73/67.7 |
| 3,315,521 | 4/1967 | Ostrofsky et al. | 73/67.8 X |

Primary Examiner—Richard C. Queisser
Assistant Examiner—Arthur E. Korkosz

[57] ABSTRACT

Ultrasonic probe for detecting inhomogeneities in railroad axles including a magnet for adhering to an end face of an axle. Three or more transducer units supported through elastic means on a transducer support, and a compression spring acting between the transducer support and the magnet to urge faces of the transducer units into angularly spaced portions of the axle end face. The transducer support is rotatable relative to the magnet through 360 degrees. An additional compression spring urges a pin into a centering hole of the axle. Indicator light means are provided on the transducer support and adjustable resistance means are provided on the transducer support for equalizing the indications produced by the transducers.

2 Claims, 8 Drawing Figures

PATENTED AUG 22 1972

INVENTOR
GIUSEPPE PETTINATO

BY *Hill, Sherman, Meroni, Gross & Simpson* ATTORNEYS

PATENTED AUG 22 1972 3,685,350

INVENTOR
GIUSEPPE PETTINATO

BY ATTORNEYS

ULTRASONIC PROBE

This application is a continuation of Ser. No. 743,650, filed July 10, 1968, now abandoned.

This invention relates to an ultrasonic probe for detecting inhomogeneities in railroad axles and more particularly to a probe which is usable with axles of various types, and which permits exploration of all critical regions of an axle inhomogeneities with a very high degree of reliability. The probe is readily operated and permits the rapid testing of axles, while being rugged and durable.

Ultrasonic probes have heretofore been proposed for use in detecting defects or inhomogeneities in railroad axles or the like, including a magnet for engaging the central portion of an end face of an axle with three or more transducers connected to the magnet for engaging angularly spaced portions of the axle end face radially outside the magnet. Probes such as heretofore proposed have been usable to test axles which conform to certain design standards and having end faces accurately formed in a plane at right angles to the axis of the axle. However, difficulties have been encountered in attempting to test axles formed according to different design standards and axles in which the end face is not accurately formed. Difficulties have also been encountered in that the indications obtained have not been uniform and reliable.

This invention was evolved with the general object of overcoming the disadvantages of such probe constructions as heretofore proposed and of providing a probe which is readily usable with axles of different types and which will produce indications with a very high degree of uniformity and reliability.

Another object of the invention is to provide an ultrasonic probe with which axles can be readily and quickly tested.

A further object of the invention is to provide an ultrasonic probe which is rugged and durable and in which projections or imperfections in the axles will not damage or impair the operation of the probe.

According to this invention, an ultrasonic probe is provided which comprises at least three transducer units having faces adapted to engage portions of the end face of an axle spaced radially from and in angularly spaced relation about the central axis thereof and holding means for pressing the transducer faces into firm engagement with the portions of the axle end faces while permitting conjoint rotation of the transducers about the axis of the axle.

Preferably and in accordance with a specific feature of the invention, the holding means comprises adhering means for adhering to the end face of the axle, preferably in the form of a permanent magnet or an electromagnet, and transducer support means connected to the adhering means and arranged to elastically hold the transducers in firm engagement with portions of the axle end face.

According to another specific feature of the invention, the adhering means and the transducer support means are axially movable relative to each other and spring means are provided acting between the adhering means and the transducer support means to urge the transducer support means toward the axle end face. Preferably, the spring means is in the form of a coiled compression spring disposed between the outer cylindrical surface of a first member associated with the adhering means and the inner cylindrical surface of a second member associated with the transducer support means.

A further specific feature of the invention relates to the provision of a pin extending through a central opening of the magnet to engage in a centering hole of the end face of the axle, the pin being axially movable and being urged by spring means, preferably a compression spring disposed within a member of the adhering means, to urge the pin into a centering hole of the axle. Another specific feature of the invention is in the dimensioning of a pole of the magnet to engage in a recessed surface portion of the end face of the axle. In combination with the feature in which the magnet is movable axially relative to the transducer support means, this feature permits testing of axles of various types.

A still further feature of the invention relates to the provision of an elastic support between a support member and each of the transducer units, the elastic support preferably being of an electrically insulating material.

A still further feature of the invention relates to the provision of electrical couplings between the transducer units and an energizing and indicating instrument including at least two adjustable resistances carried by the holding means with controls for the adjustable resistances being accessible from the outside of the holding means for equalizing the levels of signals produced by the transducer units.

Yet another feature of the invention relates to the provision of indicator light means on the holding means, arranged to be electrically coupled to the indicating instrument, the indicator light means being energized in response to signals of greater than a certain amplitude. Thus the operator obtains an indication directly from the probe of the existence of defects which might indicate that the axle should be replaced or repaired or subjected to further tests.

This invention contemplates other an more specific objects, features and advantages which will become more fully apparent from the following detailed description taken in conjunction with the accompanying drawings which illustrate a preferred embodiment and in which.

Figure 2:
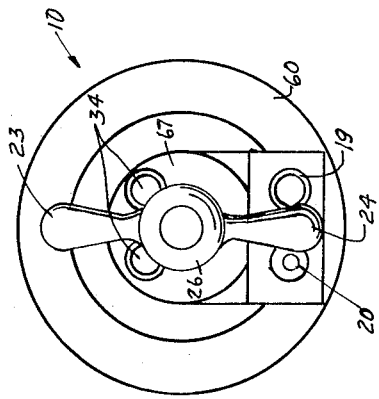
FIG. 2 is a rear elevational view of the probe of FIG. 1.
Figure 1:
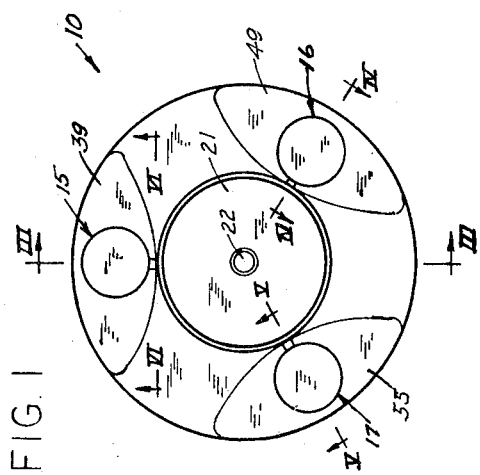
FIG. 1 is a front elevational view of an ultrasonic probe constructed in accordance with the principles of this invention.
Figure 3:
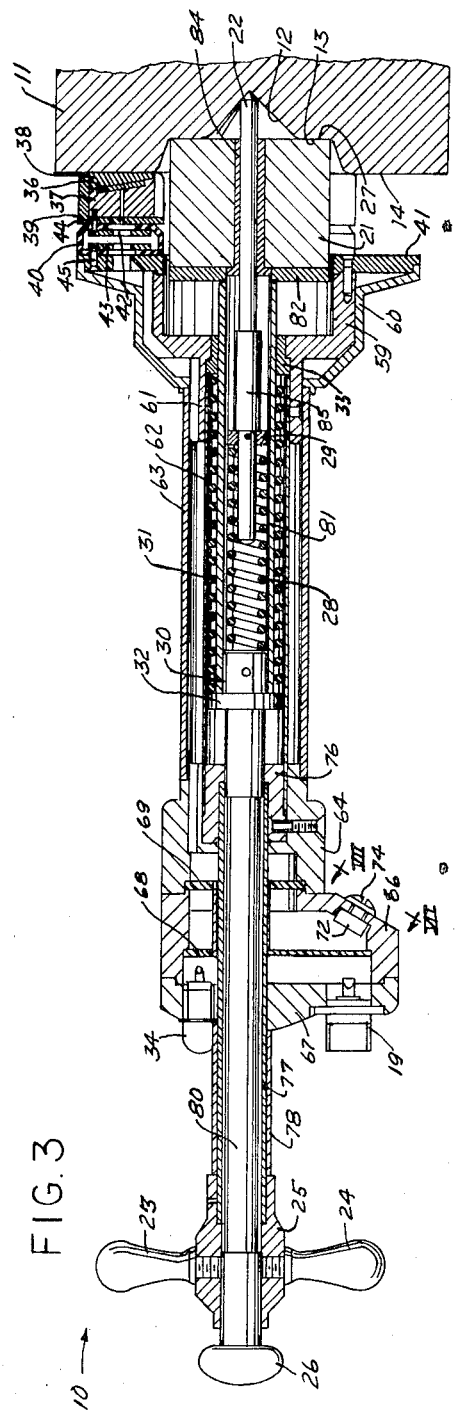
FIG. 3 is a sectional view taken substantially along line III—III of FIG. 1.

Reference numeral 10 generally designates an ultrasonic probe constructed according to the principles of this invention. The probe 10 is designed for use in testing railroad axles, an end portion of a railroad axle 11 being shown in cross-section in the cross-sectional view of FIG. 3. The illustrated axle 11 has an end face including a centering hole 12, a surface portion 13 in generally surrounding relation to the hole 12 and in a plane generally transverse to the axis of the axle and another surface portion 14 in surrounding relation to the surface portion 13, portion 14 being in a plane in spaced parallel relation to the plane of the portion 13. It should be noted that the end portions of railroad axles have a variety of configurations. In some cases there is no recessed planar surface such as a surface 13 and there is a rounded surface extending from the center hole to a planar surface corresponding to the portion 14.

The probe 10 comprises three transducer units 15, 16 and 17 in equi-angularly spaced relation about the axis of the axle 11 and at equal radial distances from the axis, having faces adapted to engage the surface portion 14 of the illustrated axle 11. The transducers 15, 16 and 17 are arranged to transmit at different angles with respect to axes thereof parallel to the axis of the axles, to transmit into and receive from regions within the axle of different distances from the end of the axle. By way of example, the region to be explored may extend over a distance of from 70 to 700 millimeters and the radial distance from the axis to the center axis of the transducers may be about 45 millimeters while the inclinations of the axes of the transducer units 15, 16 and 17 may be 19°, 14° and from 8 to 10°, respectively, the latter angle diverging in relation to the axis of the axle.

Before describing in detail the construction of the probe 10 it may be noted that in the general operation of the probe, the probe is connected to an energizing and indicating instrument through cables connected to a pair of connectors 19 and 20. Initially, the transducer units 15-17 are moved axially rearwardly or to the left as viewed in FIG. 3 with respect to a magnet 21 and with respect to a centering pin 22. This is accomplished by moving a pair of knobs 23 and 24, projecting radially from a hub 25 which is connected to the transducer units 15-17, to the left or rearwardly relative to a knob 26 which is connected to the magnet 21. With the transducer units 15-17 in such a retracted position, the probe is brought into alignment with the end of the axle 11 and the centering pin 22 is engaged in the centering hole 12 of the axle. The knob 26 is then moved manually or through the magnet attraction of the magnet 21 to the axle 11 and an end face 27 of the magnet 21, forming one pole thereof, is then engaged with the surface portion 13 and is held thereagainst by magnet forces. A compression spring 28, acting between a collar 29 on the pin 22 and a member 30 which is connected to the magnet 21, is compressed to allow the engagement of the end face 27 of the magnet with the surface portion 13.

The knobs 23 and 24 are then allowed to move forwardly under the action of a coiled compression spring 31 which acts between an enlarged diameter portion 32 of the member 30 and a collar 33 connected to the transducer units 15-17, to allow the faces of the transducer units 15-17 to engage the portion 14 of the end face of the axle 11. Then the knobs 23 and 24 are rotated through 360° to rotate the transducer units 15-17 and to scan the axle for defects. If any defects exist having a size greater than a certain minimum size, a pair of indicator lamps 34 are energized to indicate the existence of such defects to the operator.

The transducer unit 15 comprises a transducer plate 36 which may be of quartz or of a ceramic material with piezo-electric characteristics, such as lithium, sulphate, barium titanate, lead, zorcinate or the equivalent. The plate 36 is sandwiched between a backing member 37 and a coupling member 38 and is positioned at an angle such as to transmit and receive along an axis which is diverged outwardly with respect to an axis parallel to the axis of the axle, the angle preferably being 8 to 10 degrees approximately. Members 37 and 38 are disposed in a central opening of a shoe 39 of generally eliptical shape, the short axis of which is along a radial line through the axis of the transducer unit. The peripheral edges of the shoe 39 are rounded to cammingly engage any projection on the end face of the axle, so as to protect the transducer unit 15 and so as to obtain a smooth action during rotation of the transducer unit. The shoe 39 and also the coupling member 38 are preferably of materials having wear-resistance characteristics.

The transducer unit 15 together with the shoe 39 are secured through an elastic support member 40 to a plate 41 of annular form. The member 40 is of annular form and includes a generally cylindrical outer wall portion and radially inwardly extending side walls respectively held against the shoe 39 and the member 47 by means of a pair of plates 42 and 43 held by screws 44 and 45. The elastic support member 40 is preferably of rubber or the equivalent to allow displacement of the transducer unit and to insure firm engagement with the end face of the railroad axle. The use of rubber or an equivalent material having electrically insulating properties is also desirable in electrically isolating the transducer from the metallic parts of the probe. Electrical connections to the transducer 36 may be made by connecting one connecting wire to the shoe which is electrically connected to the coupling member disposed against an electrode on the outer face of the transducer with a second connecting wire extending through a central opening of the backing member 37 to an electrode on the rear face of the transducer. The connecting wires, which are not shown for the purpose of clarity, extend through aligned openings of a wall of the shoe 39, the plates 42 and 43 and the member 41.

Figure 4:
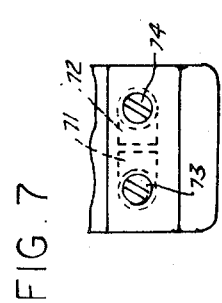
FIG. 4 is a sectional view taken substantially along line IV—IV of FIG. 1.
Figure 5:
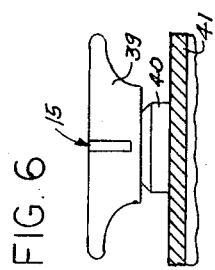
FIG. 5 is a sectional view taken substantially along line V—V of FIG. 1.
Figure 6:
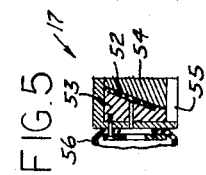
FIG. 6 is a sectional view taken substantially along line VI—VI of FIG. 1.

As shown in FIG. 4, the transducer unit 16 comprises a transducer plate 46 sandwiched between a backing member 47 and a coupling member 48 positioned within a central opening of a shoe 49, the assembly being supported from the member 41 through an elastic support member 50 in a manner identical to the support of the transducer unit 15. Similarly, as shown in FIG. 5, the transducer unit 17 comprises a transducer plate 52 sandwiched between a backing member 53 and a coupling member 54 disposed within a central opening of a shoe 55, the assembly being supported from the member 41 through an elastic support member 56 in a manner identical to the support of the transducer unit 15. The transducer plate 46 is positioned at an angle such as to transmit and receive along an axis converging inwardly toward the axis of the axle, the angle preferably being approximately 14 degrees. The transducer plate 52 is also positioned to transmit and receive along an axis converging inwardly, with the angle preferably being approximately 19 degrees. With such inclinations of the transducers, it is possible to substantially completely explore the regions of essential interest in a railroad axle.

The annular plate 41 is secured by means of screws 58 to an annular block 59 which is surrounded by a generally cup-shaped shell 60. The collar 33 is secured within the block 59 which has an axially and rearwardly projecting portion 61 affixed on the outside of an end portion of a sleeve 62 and secured on the inside of an end portion of a sleeve 63. Another annular block 64 is secured on the outside of the opposite end of the sleeve 62 and on the inside of the opposite end of the sleeve 63. Connecting wires for the transducer units extend through passages formed in the block 59, through the space between the sleeves 62 and 63 and through passages in the block 64.

Figure 7:
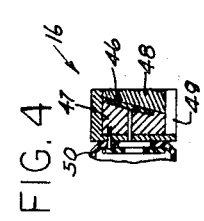
FIG. 7 is a view showing equalizer adjustment means, looking from a position indicated by line VII—VII in FIG. 3.

A hollow block 66 is secured to the rearward end of the block 64 with an end plate 67 being secured to the rearward end of the block 66, the end plate 67 serving as a support for the connectors 19 and 20 and for the indicator lamp 34. A pair of printed circuit boards 68 and 69 are supported within the block 66 and the block 66 also supports a pair of adjustable resistance units 71 and 72 controlled by adjustment screws 73 and 74, shown in FIG 7. The electrical connections are described hereinafter in connection with the schematic diagram of FIG. 8.

A collar 76 is secured within the block 64 and extends within the rearward end of the sleeve 62 while being disposed around the forward end of a sleeve 77 which extends rearwardly through the end plate 67 with the hub 25 being secured to the rearward end of the sleeve 77. A spacer sleeve 78 is disposed on the outside of the sleeve 77 between the hub 25 and the plate 67.

As above indicated, the knob 26 is connected to the magnet 21. The connection comprises a rod 80 having a rearward end to which the knob 26 is secured, the rod 80 extending within the hub 25 and the sleeve 77, the forward end of the rod 80 being secured to the member 30. Member 30 is secured within the rearward end portion of a sleeve 81 and the forward end of the sleeve 81 is secured to a plate 82 secured on the rearward end face of the magnet 21. It is noted that the spring 31 is disposed between the outer cylindrical surface of the sleeve 81 and the inner cylindrical surface of the sleeve 62.

The centering pin 22 is guided by a sleeve 84 secured within a central opening through the magnet 21 and the centering pin 22 has an intermediate portion 85 of enlarged diameter to provide a shoulder for engaging the rearward end of the sleeve 84 to limit movement of the pin 22. A rearward end portion of the pin 22 supports the collar 29 and extends within the spring 28 which is confined within the sleeve 81.

This construction results in a probe which may be readily used to make a rapid test of a railroad axle or the like and which is very rugged and durable. The springs 28 and 31, used in the manner as illustrated, make it possible to use the probe with axles having various configurations, while the faces of the transducer units firmly engage the surface portions on the end face of the axle. The transducer units 15–17 are, of course, readily rotated by rotation of the knobs 23 and 24.

Figure 8:
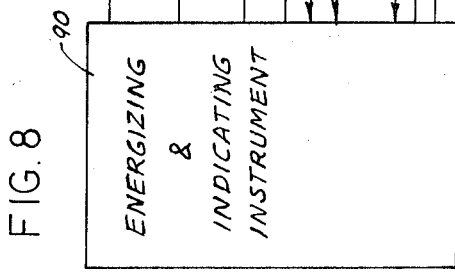
FIG. 8 is an electrical circuit diagram.

Referring now to FIG. 8, the transducer units 15, 16 and 17 are connected through conductors 87, 88 and 89 to an energizing and indicating instrument 90, the conductors 87-89 being defined in part by wires within the probe unit 10 and in part by wires within a connecting cable coupled to the connector 19. Conductors 87, 88 and 89 are also connected to coupling circuits 91, 92 and 93 which may be physically located on the printed circuit boards 68 and 69. The coupling circuits 91, 92 and 93 are connected through wires 94, 95 and 96 to the energizing and indicating instrument 90 to supply received signals thereto. The adjustable resistors 71 and 72 are connected to the coupling circuits 91 and 92 to adjust the levels of the received signals applied from the transducer units 15 and 16 to the instrument 90. A fixed resistor 97 may be connected to the coupling circuit 93 to provide a fixed level for the transducer unit 17. By adjustment of the resistors 71 and 72, the levels of received signals may be equalized so that regardless of which transducer receives a defect signal, the amplitude of the signal accurately indicates the magnitude of a flaw.

The energizing and indicating instrument 90 preferably includes a threshold circuit of a conventional type to develop an output signal only when a defect signal exceeds a certain amplitude. When a defect signal is received having an amplitude above the threshold amplitude, a circuit is completed to a pair of conductors 98 and 99 which are connected to the indicator lamps 34. Accordingly, the operator can determine from an indication on the probe unit itself, whether the axle being tested will meet predetermined standards.

It may be noted that a common or ground conductor is connected to terminals of the transducer units 15–17 as well as to the coupling circuits 91–93 and the instrument 90. As above indicated, the elastic support members 30, 50 and 56 are preferably of an electrically insulating material and the common ground connection is electrically isolated from the metallic parts of the probe. This is desirable because extraneous or noise signals might otherwise be developed during rotation of the transducer units 15–17.

It will be understood that modifications and variations may be effected without departing from the spirit and scope of the novel concepts of this invention.

I claim as my invention:

1. In an ultrasonic probe for detecting inhomogeneities in an axle or the like having a central axis, at least three transducer units having faces adapted to engage portions of an end face of said axle spaced radially from said central axis and in angularly spaced relation about said central axis, holding means for pressing said transducer faces into firm engagement with said portions of said end face while permitting conjoint rotation of said transducer units about said central axis, means for mounting a first one of said transducer units with its axis extending in a first direction diverging from said central axis, means for mounting a second one of said transducer units with its axis extending in a second direction converging toward said central axis, and means for mounting a third one of said transducer units with its axis extending in a third direction converging toward said central axis.

2. In an ultrasonic probe as defined in claim 1, wherein said first direction extends at an angle between 8° and 10° relative to said central axis, said second direction extending at an angle of approximately 14 degrees relative to said central axis, said third direction extending at an angle of approximately 19 degrees relative to said central axis.

* * * * *

UNITED STATES PATENT OFFICE
CERTIFICATE OF CORRECTION

Patent No. 3,685,350          Dated August 22, 1972

Inventor(s)    Giuseppe Pettinato

It is certified that error appears in the above-identified patent and that said Letters Patent are hereby corrected as shown below:

On the first page of the above patent, please insert the following after line [21]:

[30] FOREIGN APPLICATION PRIORITY DATA

July 12, 1967       Italy ......... 18,307

Signed and sealed this 2nd day of July 1974.

(SEAL)
Attest:

EDWARD M. FLETCHER, JR.           C. MARSHALL DANN
Attesting Officer               Commissioner of Patents